(12) United States Patent
Bruno et al.

(10) Patent No.: US 6,434,631 B1
(45) Date of Patent: Aug. 13, 2002

(54) METHOD AND SYSTEM FOR PROVIDING COMPUTER STORAGE ACCESS WITH QUALITY OF SERVICE GUARANTEES

(75) Inventors: John Louis Bruno, Davis, CA (US); Jose Carlos Brustoloni; Eran Gabber, both of Chatham, NJ (US); Banu Ozden; Abraham Silberschatz, both of Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/418,795

(22) Filed: Oct. 15, 1999

(51) Int. Cl.[7] ............................................. G06F 13/14
(52) U.S. Cl. ................. 710/6; 710/5; 710/36; 710/39; 710/40; 709/102
(58) Field of Search .................. 709/102–106; 710/5, 6, 36, 39, 40, 43; 725/97

(56) References Cited

U.S. PATENT DOCUMENTS 5,761,692 A * 6/1998 Ozden et al. ............... 707/205
5,828,878 A * 10/1998 Bennett ...................... 709/100
6,112,221 A * 8/2000 Bender et al. .............. 709/102

OTHER PUBLICATIONS

S. Floyd and V. Jacobson, "Random Early Detection Gateways for Congestion Avoidance", *IEEE/ACM Transactions on Networking*, Aug. 1993.

B. Suter, T.V. Lakshman, D. Stiliadis, and A. K. Choudhry, "Design Considerations for Supporting TCP with Per–Flow Queueing", *Proceedings of IEEE INFOCOM San Francisco*, Mar. 1998.

R. Guérin, S. Kamat, V. Peris, and R. Rajan, "Scalable QoS Provision Through Buffer Management," *Proceedings of the ACM SIGCOMM Vancouver*, Sep. 1998.

Ellen L. Hahne and Robert G. Gallager, Round Robin Scheduling for Fair Flow Control in Data Communication Networks, *IEEE International Conference on Communications*, Jun. 1986, pp. 103–107.

Dong Lin and Robert Morris, Dynamics of Random Early Detection, *IEEE SIGCOMM '97*, Sep. 1997.

\* cited by examiner

*Primary Examiner*—Jeffrey Gaffin
*Assistant Examiner*—Ilwoo Park
(74) *Attorney, Agent, or Firm*—Darby & Darby

(57) ABSTRACT

A method and system for servicing disk I/O requests from domains which have been guaranteed minimum quality of disk service maintains I/O requests for each domain are in separate queues. The queues are serviced by a disk scheduler which selects requests from the queues in accordance with a fair queuing scheduling algorithm that considers the estimated time required to service the request at the head of a queue with regard for the size of the input or output associated with the request, the proportion of disk bandwidth assigned to the particular domain, and the state of the other queues.

14 Claims, 2 Drawing Sheets

US 6,434,631 B1

METHOD AND SYSTEM FOR PROVIDING COMPUTER STORAGE ACCESS WITH QUALITY OF SERVICE GUARANTEES

TECHNICAL FIELD

This invention is related to a method of scheduling computer storage input and output requests to provide minimum quality of service guarantees.

BACKGROUND OF THE INVENTION

Increasingly, computer users are relying upon a single computing platform to execute multiple applications. In such situations, the various applications executing on the platform must share access to the available system resources, such as disk I/O. In those situations where available resources far exceed the requirements of the applications, control of access to system resources can be relatively straightforward. However, it is often not practical or economical to over provision resources in this manner. Thus, the operating system must make various resource allocation decisions for the various executing processes.

In many situations, it is desirable for a process to be provided with a guaranteed minimum level of system resources. For example, multimedia applications often require that I/O services (e.g., disk or network accesses) be provided with a certain quality of service (e.g., minimum throughput or maximum delay). If the quality of service declines, the performance of the application can suffer, resulting in jerky video display, choppy audio, and other problems.

Ideally, a system should provide a quality of service ("QoS") guarantee to an application requesting it. If the minimum performance requirement for the requested service cannot be guaranteed, the system should not accept the request.

Conventional operating systems, such as Windows NT and UNIX both dynamically compute the priorities of unprivileged processes and allocate system resources accordingly. Although high priority applications are serviced in advance of lower priority applications, such systems do not guarantee minimum service levels. While a user may be merely annoyed of the system delays the execution of an interactive application to service another process, such a delay in a multimedia application can render the application's audio or video output wholly unusable.

A variety of specific scheduling algorithms have been proposed to provide levels of QoS guarantees. However, these conventional approaches consider each resource in isolation, neglecting interactions. Unfortunately, this is not realistic due to "closed-loop" nature of most applications: After completion of a request on one resource (e.g., disk), applications often have to compete for another resource (e.g., CPU) before being able to make another request on the first resource. In such situations, scheduling delays on each resource can accumulate and make actual throughput much lower than expected if each resource is considered in isolation.

SUMMARY OF THE INVENTION

A disk scheduling algorithm with high cumulative service guarantees, low delay, and good fairness is provided by assigning I/O requests from various system elements to particular domains. Each domain is guaranteed a minimum quality of service and an admission control algorithm is used to determine whether a new QoS domain can be added without violating the QoS guarantees of existing domains. I/O requests from each QoS domain are maintained in separate FIFO queues and are serviced by a disk scheduler selects in accordance with the fair queuing scheduling algorithm of the invention which preserves the quality of service guarantees. An I/O request is maintained at the head of the corresponding domain queue while it is being serviced and is removed only after service completion.

According to the invention, the scheduling algorithm associates a start tag, Si, and a finish tag, Fi, with each domain queue i which is an element of the set of domains D. Initially, Si and Fi are both zero. As requests are added to a queue and subsequently serviced, the start and finish tags are updated as to reflect the estimated time required to service the request at the head of the queue with regard for the size of the input or output associated with the request and the proportion of disk bandwidth assigned to the particular domain. When the disk scheduler is ready to service a new request, the request is selected from the queue for the domain with the smallest finish tag among all busy domains, i.e., those domains which have I/O requests either waiting in the queue or being serviced. In this implementation, a domain can be safely deleted, freeing up the fraction of disk resource assigned to it, when the start tags for all of the other busy domains greater than or equal to the finish tag for the domain to be deleted.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
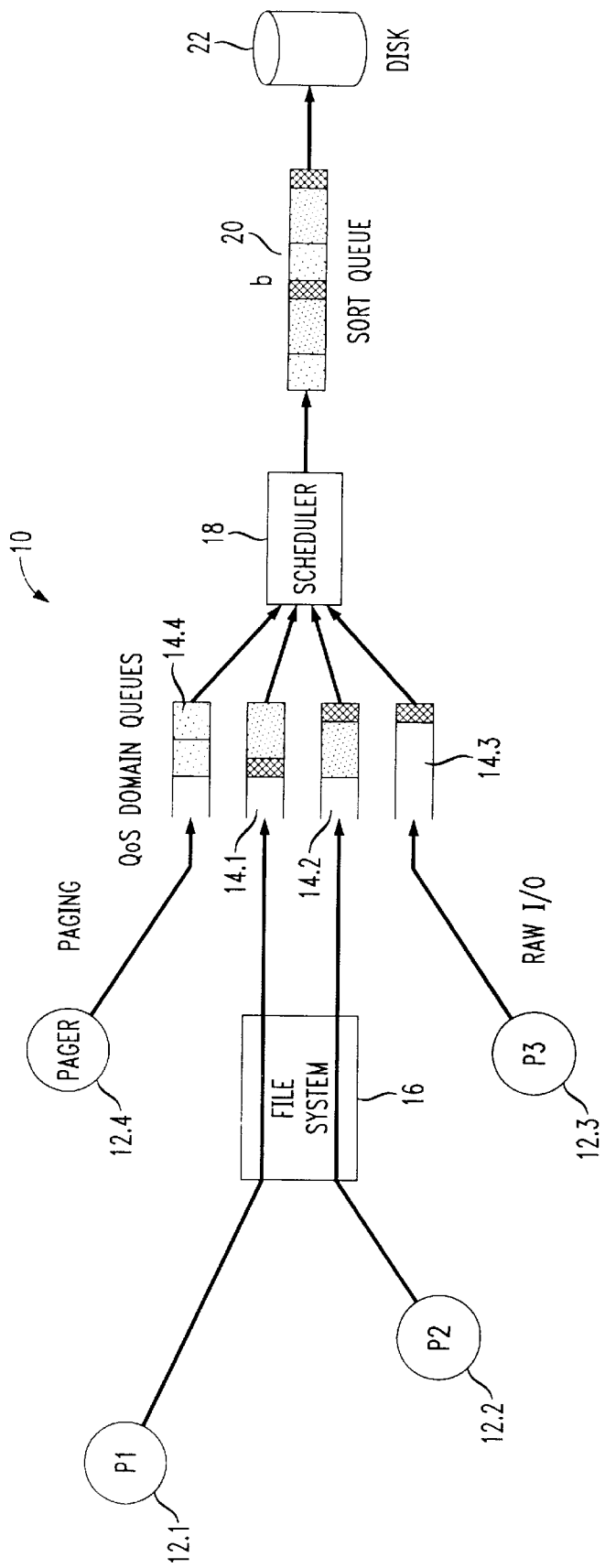
FIG. 1 is a block diagram of a domain queuing system.

FIG. 1 is an illustration of a domain-based queuing system for scheduling disk I/O requests to provide quality-of-service ("QoS") guarantees. The system includes at least one QoS domain 12.1–12.4 which represents a collection of related disk I/O requests. All I/O requests to the disk are partitioned among these domains. Each domain has a quality-of-service guarantee which indicates that the cumulative I/O rate associated with the domain will not fall below a predetermined limit. To ensure QoS guarantees, all disk I/O activity needs to be scheduled and managed, including the file system I/O, raw I/O, and the operation of the paging daemon. In addition to scheduling disk activity, it is also necessary to identify the source of various disk activities to be able to assign I/O requests to the appropriate QoS domain. In the illustrated example, domains 12.1 and 12.2 represent the I/O requests for programs P1 and P2, respectively, running on a computer system and being preprocessed by the file system 16, domain 12.3 is raw I/O, and domain 12.4 represents I/O associated with the paging daemon. Each QoS domain has an associated queue 14.1–14.4. When an I/O request "arrives" at its QoS domain, i.e., is issued by a task or process assigned to the domain, the request is inserted into the corresponding queue. In accordance with a selection algorithm discussed more fully below, a disk scheduler 18 selects I/O requests from the domain queues 14 and places them into a sort queue 20 in batches of size b (or less). The sort queue 20 is used to optimize the performance of disk 22 by reordering I/O requests based on the current state of the disk 22. The requests in the sort queue 20 are serviced in batches, i.e., I/O requests in one batch in the sort queue 20 are serviced by the disk before any additional requests are selected by the scheduler 18 from the domain queues. For simplicity, the scheduling algorithm is presented for the case where for b=1, that is, I/O requests are submitted one-at-time to the disk 22 and each is serviced to completion before another request is selected. However, the algorithm can be extended to systems where b>1 as will be apparent to one of skill in the art and as discussed further below.

In the following discussion, D denotes the set of QoS domain indices. To provide QoS guarantees, it is first necessary to have a way of prescribing the required level of service. To this end, each domain Di is associated with a weight $w_i$ which represents a measure of the "proportion" of the disk bandwidth reserved for the domain. To provide strict QoS guarantees, an admission control mechanism is required to limit disk access and bandwidth shares for each domain and ensure that $\Sigma w_i \leq 1$, where the sum is taken over all domains in the system. If proportional sharing (i.e., fairness), and thus, proportional bandwidth, etc. guarantees are sufficient, there is no need to constrain the sum of the weights in this manner.

When addressing QoS guarantees, it is useful to consider the cumulative service received by each domain, as opposed to various measure of instantaneous throughput. A scheduling algorithm provides a cumulative service guarantee to a domain if, during a given period of time, the actual amount of service provided to the domain is greater than or equal to the total time the domain is busy times a data transfer rate less a constant representing the discrepancy between the actual scheduler and an ideal model. This can be represented mathematically as follows.

A domain is considered busy when it has at least one I/O request in its queue either waiting for service or being serviced. The disk server is considered to be busy at a given time if, at that time, there is at least one domain which is busy. Let $s_i(T, t)$ denote the amount of service obtained by a domain Di during the time interval [T,t] and $b_i(T,t)$ be the total time that domain $D_i$ is busy during that time interval. Further, let $a_i$ and $K_i$ be a pair of non-negative numbers. The value of $a_i$ is a dimensionless measure of service received at a domain over multiple busy periods. The value of $K_i$ has the dimension of bytes and is a measure of the discrepancy between the disk I/O scheduler and an idealized system where the domain i receives whenever it is busy service at least at the rate $a_i r$ from a disk having a nominal data transfer rate of r. A scheduling algorithm provides what is termed an $(a_i, K_i)$ cumulative service guarantee to domain Di if, for all time T<t:

$$s_i(T,t) \geq b_i(T,t) a_i r - K_i \quad \text{(Equ. 1)}$$

The interpretation of the $(a_i, K_i)$ cumulative service guarantee is that whenever domain $D_i$ is busy, it is transmitting data at a rate which is at least $a_i r$. Extending this analysis, the cumulative throughput of domain Di over time interval [T,t] is:

$$s_i(T,t)/b_i(T,t) \quad \text{(Equ. 2)}$$

Thus, as the busy time $b_i(T,t)$ of a domain i increases, the cumulative service guarantee $(a_i, K_i)$ provides a lower bound equal to $a_i r$ on the cumulative throughput of data I/O for domain i.

Once a set of domains Di has been established with respective bandwidth weights $w_i$ and QoS guarantees $(a_i, K_i)$ for that bandwidths, the QoS guarantees must be maintained by selecting I/O requests to service from the appropriate domain queues. An admission control algorithm is used to determine whether a new QoS domain can be added without violating existing domains' QoS guarantees. Such an algorithm analyzes the existing QoS guarantees and preferably does not permit a new domains to be established unless the requested minimum cumulative disk throughput can be guaranteed. Various methods are available for performing this analysis as will be understood by those of skill in the art. For purposes of the following discussion, it is assumed that the various QoS domains have already been established.

Figure 2:
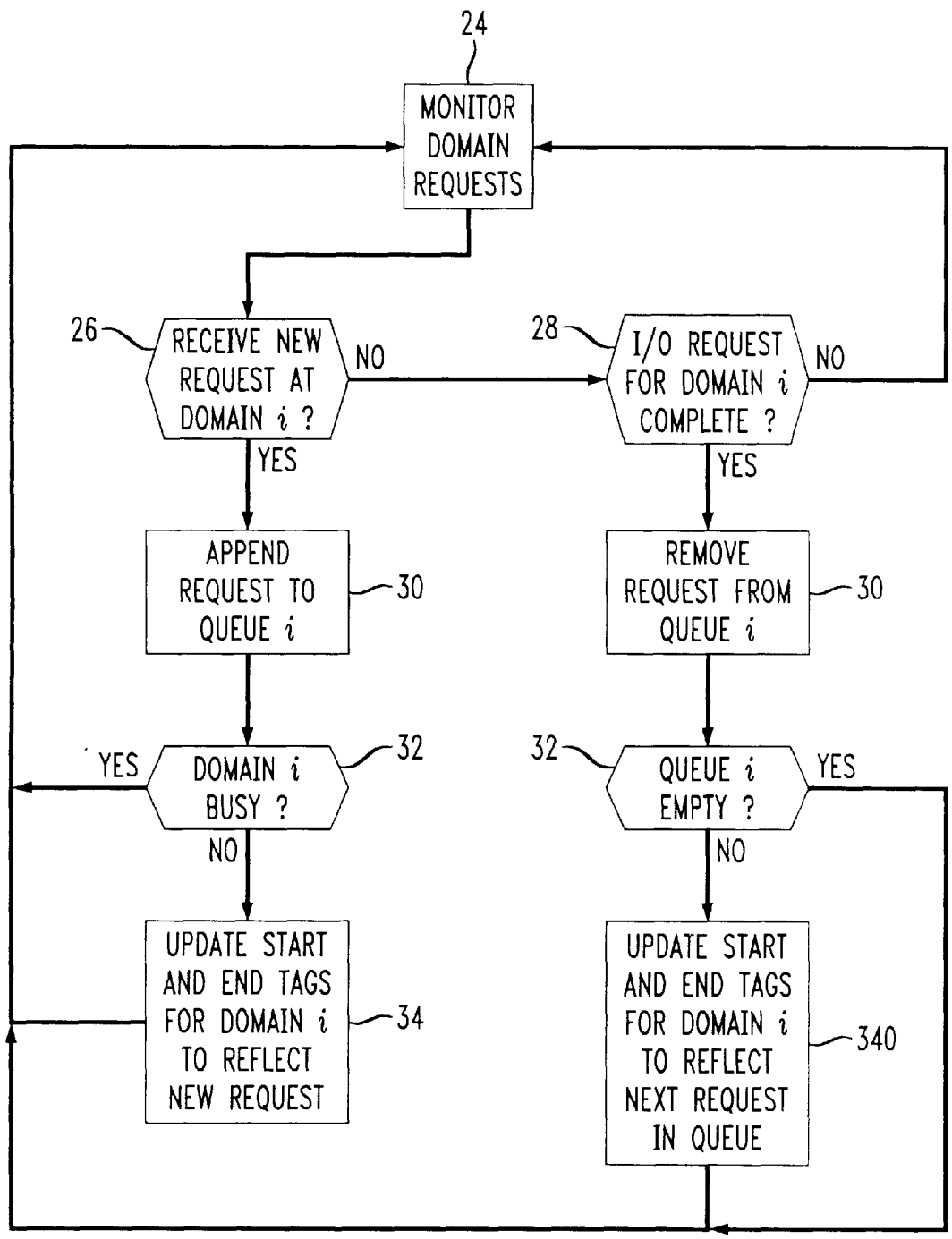
FIG. 2 is a flowchart generally illustrating a method for maintaining the queues and domain tags for the system of FIG. 1.

FIG. 2 is a flowchart generally illustrating a method for maintaining the queues and domain tags for the system of FIG. 1. Each QoS domain queue 14.i has a start tag, Si and a finish tag, Fi which are initially both set to zero. As requests are added to a queue and subsequently serviced, the start and finish tags are updated to reflect the estimated time required to service the request at the head of the queue with regard for the size of the input or output associated with the request and the proportion of disk bandwidth assigned to the particular domain. An I/O request is maintained at the head of the corresponding domain queue while it is being serviced and is removed only after service completion.

To help determine the proper values of the start and end tags, a virtual work function v(t) is defined such that v(0)=0. During a server busy period, v(t) is equal to the minimum of the start tags of the busy domains at time t. At the end of a server busy period, v(t) is set to the maximum of the finish tags of all the domains.

During the operation of the scheduler 18, the arrival and completion of I/O requests are monitored (steps 24–28). When a new I/O request arrives at domain i at time t, the new request is appended to the end of the domain i queue (step 30). If domain i is already busy, the start and end tags Si and Fi are not changed. If, however, the domain i is not busy, the start and end tags are updated to indicate the time necessary to service the new I/O request given its length $l_i$ the bandwidth weight $w_i$ reserved for the domain, and the finish tags for the other domains (step 34). In particular:

$$Si = \max[v(t), Fi] \quad \text{(Equ. 3a)}$$

$$Fi = Si + l_i/w_i \quad \text{(Equ. 3b)}$$

When the scheduler 18 determines that disk 22 is available to process another I/O request, a request is selected from the domain queue with the smallest finish tag among all the busy domains. When servicing of the request is complete (step 28), the request is removed from the appropriate domain queue (step 30). If the domain queue is empty, the start and end tags are left unchanged (step 32). Otherwise, domain i tags are updated to indicate the time necessary to service the I/O at the head of the queue in view of the request's length, the bandwidth weight reserved for the domain, and the finish tags for the other domains:

$$Si = Fi \quad \text{(Equ. 4a)}$$

$$Fi = Si + l_i/w_i \quad \text{(Equ. 4b)}$$

The process then continues so long as there is at least one busy domain. It can be appreciated that when the finish tag Fi for a domain i is less than or equal to the start tags for all other busy domains, domain i can be safely deleted and the bandwidth fraction wi assigned to it released.

In certain instances, when the scheduler selects a next I/O request, there may be more than one domain queue with the same smallest finish tag. Various tie-breaking strategies can be used in this situation. In a preferred embodiment, the scheduler chooses as the next request to dispatch the one that reduces the disk arm movement according to one of two well-known algorithms: C-SCAN or shortest-distance, using the current location of the disk head from the last request. The C-SCAN technique is based on the concept that the disk arm moves from the outer cylinder to the inner cylinder and requests are serviced on the shortest-seek basis. Thus, for this technique, the selected request is the closest request with a higher block number, or if there is none, the request with the smallest block number will be chosen. In the shortest-distance technique, the closest request in either direction is chosen. Most preferably, both tie-breaking algorithms are available and the choice of which to use is controlled by a flag in the system kernel.

The queue selection algorithm discussed above provides for a ($a_i$, $K_i$) cumulative service guarantee for domain i, where:

$$a_i = \frac{w_i}{1 + w_i l_{max} / l_{i,min}} \qquad \text{(Equ. 5a)}$$

and $$K_i = \max(l_j / w_j) + l_{max} / w_i; \; j \in D \qquad \text{(Equ. 5b)}$$

where $l_{max}$ is the largest request size over all the requests and $l_{i,min}$ is the smallest request size for domain i. These equations can be used by the admission control algorithm to determine whether sufficient capacity exists to add a domain to the system.

The veracity of Equs. 5a and 5b can be appreciated by considering the worst-case scenario (in terms of cumulative service) for domain i, which is for it to submit a small I/O request at the start of a domain i busy period and have to wait for the in-service request and all other requests with smaller finish tags to complete service. After completing the single I/O request, domain i becomes idle once again. Repeating this scenario and calculating the ratio of the amount of domain i bytes served to the total bytes served during the domain i busy periods illustrates that the cumulative service index, ai, is less than wi and it decreases with increasing disparity in request sizes. The formula for the bound on ai can be used to determine the value of wi to achieve a feasible ai bound. The expression for Ki is obtained by calculating the maximum amount of service that can be obtained by other domains while a domain i request is waiting. The worst-case scenario occurs when domain i gets "ahead" of the other domains by a maximum amount resulting in a domain i request having to wait for other domains to catch up.

An additional consideration which may impact QoS guarantees is the effect of disk latency. When I/O requests are large, disk latency is a small percentage of the service time. However, as the size of a request decreases, the effect of latency becomes more important. It can be appreciated that large numbers of small requests will degrade the overall system throughput and a disk scheduler with QoS support may reduce the cumulative throughput of domains with large requests if disk latency is ignored. To address this issue, the above method is be modified such that a predetermined amount is "added" to the length of a received I/O request to compensate for disk latency. In particular, when an I/O request of length $l_i$ is received, it is processed as if it had a length $l_i + l_{lat}$, where $l_{lat}$ corresponds to a length in bytes that is a measure of the disk latency. One such measure is the number of bytes that can be serviced by the disk at its nominal data transfer rate.

It should be noted that the above cumulative service bounds have been discussed for a sort queue of size one (i.e., b=1). If the size of the sort queue is increased to obtain more effective disk utilization, it impacts the cumulative service guarantee. When b=1, the sort queue holds one request which can be as large as $l_{max}$. Roughly, for a situation where b>1, the $l_{max}$ term in Equs. 5a and 5b is replaced by a term which represents the size, in bytes, of the sort queue.

Note that when b>1, the scheduler preferably selects b requests at a time and passes them as a batch to the sort queue 20 (where they may be further sorted using an algorithm such as C-SCAN or shortest-distance). The scheduler selects the requests in succession using the same criteria as used to select a single request. The requests are processed using batching techniques to ensure that the last request in the previous batch will complete before any request in the new batch, thus preserving the QoS guarantees employed to select the requests in a given batch. Preferably, the disk scheduler select another b requests and dispatches the next batch when all but one of the requests in the previous batch complete, i.e., as the last requests in the previous batch is being serviced. This enables a disk sorting routine to pick the request in the new batch that is closest to the last request in the previous batch as the first one to service.

The selected requests are processed using batching techniques, as opposed to pipelining, because a pipelined system conflicts with providing per-domain performance measures. In particular, pipelining techniques, employed by one or both of the disk hardware or the disk driver, allow requests to be reordered according to which requests are more "attractive" to the pipelining algorithm based on criteria such as estimated processing time, disk head placement, etc. This shuffling of requests can cause a domain to starve or experience unacceptable delays since processing of earlier requests may be delayed an unacceptable amount while newer requests are serviced.

There are many points in an operating system where resource scheduling can be applied to control disk I/O. In a particular implementation of the invention, the method and system for providing computer storage access with quality of service guarantees of the invention is implemented at the disk driver level. The invention can be implemented in a variety of operating systems. In a particular implementation, the invention was implemented in the FreeBSD operating system by modifying the standard disk driver as discussed below. FreeBSD is an operating system for computer systems based on both the Intel CPU architecture, which includes the 386 and 486 and Pentium processors.

The conventional FreeBSD disk driver maintains a single disk I/O request queue. To implement a QoS domain-based disk driver according to the invention, the FreeBSD driver was updated to maintain separate I/O requests queues per domain and to tag all I/O requests with the identity of the requesting QoS domain. The buf data structure, which is the FreeBSD interface to the disk driver, was modified to contain a pointer to the domain structure. The kernel routines that call the functions to allocate and deallocate buffer headers were changed to store or delete, respectively, the pointer to the domain that caused the disk I/O. These changes are not dependent on a particular file system. In addition, the file I/O, direct I/O, raw I/O and page daemon operations were only slightly modified so as to store this and minor miscellaneous information in the buffer header.

In this embodiment, default QoS domains are maintained, one for the kernel and the other for the page daemon. The kernel QoS domain is charged for the disk I/O requests that are not initiated by a user-level domain and all of the pager's disk activity is assigned to the QoS domain of the page daemon. Although somewhat more complicated, preferably paging activity is charged to the user process that caused the paging. All other disk I/O activity is charged to the domain of the process that caused the I/O, such as illustrated in FIG. 1.

The scheduler was implemented by adding hooks to the strategy, start, and done routines. The strategy routine was modified to implement per-domain queuing. Each domain data structure has a pointer to a disk I/O queue, and disk I/O requests are queued in their domain using the pointer in the buffer header. For each per-domain request queue, a start tag and a finish tag are maintained and updated as described above.

The start routine was modified to dequeue the I/O requests from the per-domain I/O queues in accordance with the novel scheduling algorithm. When the sort queue size b is greater than 1, the start routine dequeues I/O requests in batches to benefit from possible reordering of I/O requests to minimize disk latency overhead, while providing performance guarantees to domains. Batching ensures that the next batch of requests are queued at a time so that they are all serviced after all the requests in the previous batch. Batch size, b, can be set to any positive integer.

When the start routine is called, if the previous batch is completed, the next batch is formed. To do this, the start routine selects the first b requests according to the QoS method discussed above. Once a batch is formed, each time the start routine is called (i.e., upon completion of a disk I/O transfer, or when strategy queues a new request), it dequeues only the requests in the current batch, and updates the server virtual time function v(t) in accordance with the invention. The done routine was updated only to the extent necessary for batch bookkeeping. When all the requests in the current batch have been completed, a new batch may be started.

One additional aspect which can be addressed is the issue of fragmentation. When I/O requests vary in length, tasks with small requests suffer since they might get stuck behind the large requests of competing tasks. To address this problem, the conventional FreeBSD kernel limits each physical I/O request to a preset maximum, such as 64K bytes. Requests which exceed the size limit are broken into smaller units, each of which is dispatched separately.

Since a request completes when all its fragments are processed, a disk scheduler with QoS support does not benefit from ordering fragments of the same request linearly. For example, if the scheduler assigns all the fragments the same finish tag (the finish tag that the entire request would have received if it were not fragmented), the performance of the competing tasks with smaller I/O requests would improve without degrading performance of the task with fragmented request. However, the disk scheduler within the driver cannot distinguish fragments of a large I/O request from non-fragmented discrete I/O requests. To address this problem, the routines in the FreeBSD kernel, for example, which dispatch the fragments can be altered to flag the first and last buffer headers of the fragments of a single cluster, and to store the total request size in the first and last buffer header. The disk scheduler can then use this information to treat the separate fragments as a unit wherein the finish tag is only incremented once per cluster by the total size of the request.

Care must also be taken to limit interleaving of fragments from separate (large) requests because interleaving fragments can drastically reduce system throughput. To combine the best of both fragmentation and permitting large request sizes (which allows reading contiguous disk positions as sequentially as possible), the kernel can be modified to issue the fragments in groups. In particular, the conventional FreeBSD kernel code for raw I/O issues one fragment at a time and sleeps until that fragment is completed. The relevant routine (physio()), is preferably modified to issue up to n fragments at one time and to sleep only on the last fragment request. Fragmentation in conjunction with a tie breaking rule that picks the adjacent blocks (as described above) results in a substantial improvement in performance. As will be appreciated by one of skill in the art, cleanup code may also be required at wakeup time to handle errors, short reads, or out-of-order completions.

While the invention has been particularly shown and described with reference to preferred embodiments thereof, it will be understood by those skilled in the art that various changes in form and details may be made therein without departing from the spirit and scope of the invention.

We claim:

1. A method for scheduling servicing of disk I/O requests associated with a plurality of domains, each domain D having a respective quality of service guarantee including a respective reserved bandwidth weight w, the method comprising the steps of:

(a) providing a queue Q for each domain D, each queue having a start tag S and a finish tag F;

(b) in response to the receipt of an I/O request having a length li from a particular domain Di:
appending the I/O request to the queue Qi associated with the domain Di; and
updating, if the domain Di is not busy, the start tag Si and finish tag Fi of the queue Qi to indicate the time necessary to service the I/O request in accordance with the length li, the reserved bandwidth weight wi of the domain Di, and the finish tags for the other queues;

(c) identifying a queue Qj having the smallest finish tag among all domains which are busy and selecting an I/O request from the queue Qj;

(d) servicing the selected I/O request; and (e) in response to completion of servicing of the selected I/O request:
removing the serviced I/O request from the queue Qj; and
adjusting, if the queue Qj is not empty, the start tag Sj and finish tag Fj of the queue Qj to indicate the time necessary to service a next I/O request in queue Qj accordance with a length lj of the next I/O request, the reserved bandwidth weight wj of a domain Dj associated with the queue Qj, and the finish tags for the other queues.

2. The method of claim 1, wherein:

the step of updating comprises the steps of:
setting the start tag Si equal to the maximum of a virtual work function v(t) and the finish tag Fi; and
setting the finish tag Fi equal to the start tag Si plus the length li divided by the reserved bandwidth weight wi, and the step of adjusting comprises the steps of:
setting the start tag Sj equal to the finish tag Fj; and
setting the finish tag Fj equal to the start tag Sj plus the length lj divided by the reserved bandwidth weight wj.

3. The method of claim 2, wherein:

v(O)=0;

during a server busy period, v(t) is equal to the minimum of the start tags of the busy domains at a time t; and at the end of a server busy period, v(t) is set to a maximum of the finish tags of all the domains.

4. The method of claim 1, wherein the step of identifying further comprises the step of resolving a tie between two or more domain queues having the same smallest finish tag by selecting the particular next I/O request so as to reduce the disk latency.

5. The method of claim 1, further comprising the step of permitting deletion of a domain Dk only when the finish tag Fk for domain Dk is less than or equal to the start tags for all other busy domains.

6. The method of claim 1, further comprising the step of including a measure of disk latency in the length of an I/O request.

7. The method of claim 1, wherein:

step (c) is repeated a predetermined number of times prior to proceeding to step (d) to thereby select a plurality of I/O requests from identified queues Qj; and each of the plurality of selected I/O requests are serviced a batch during step (d) before any additional requests are selected from the domain queues.

8. The method of claim 1, further comprising the steps of:

locating an I/O request in a particular queue having a size greater than a predetermined maximum;

dividing the located I/O request into a plurality of I/O request fragments, each of which is separately placed in said particular queue.

9. The method of claim 8, wherein:

the finish tag of the particular queue is adjusted as if the plurality of I/O request fragments were a single request.

10. A system for servicing of disk I/O requests associated with a plurality of domains, each domain D having a respective quality of service guarantee including a respective reserved bandwidth weight w, the system comprising:

a computer processor;

a memory including a plurality of queues Q, each queue associated with a particular domain D and having a start tag S and a finish tag F;

said memory further comprising a computer program including subroutines for instructing the computer processor to:

(a) in response to the receipt of an I/O request having a length li from a particular domain Di:

append the I/O request to the queue Qi associated with the domain Di; and update, if the domain Di is not busy, the start tag Si and finish tag Fi of the queue Qi to indicate the time necessary to service the I/O request in accordance with the length li, the reserved bandwidth weight wi of the domain Di, and the finish tags for the other queues;

(b) identify a queue Qj having the smallest finish tag among all domains which are busy and select an I/O request from the queue Qj to be serviced by a data storage device; and (c) in response to completion of servicing of the selected I/O request:

remove the serviced I/O request from the queue Qj; and adjust, if the queue Qj is not empty, the start tag Sj and finish tag Fj of the queue Qj to indicate the time necessary to service a next I/O request in queue Qj accordance with a length lj of the next I/O request, the reserved bandwidth weight wj of a domain Dj associated with the queue Qj, and the finish tags for the other queues.

11. The system of claim 10, wherein:

the updating subroutine comprises computer code to instruct the processor to:

set the start tag Si equal to the maximum of a virtual work function v(t) and the finish tag Fi; and set the finish tag Fi equal to the start tag Si plus the length li divided by the reserved bandwidth weight wi; and the adjusting subroutine comprises computer code to instruct the processor to:

set the start tag Sj equal to the finish tag Fj; and set the finish tag Fj equal to the start tag Sj plus the length lj divided by the reserved bandwidth weight wj.

12. The system of claim 11, wherein:

v(O)=O;

v(t) is equal to the minimum of the start tags of the busy domains at a time t during a server busy period; and v(t) is set to a maximum of the finish tags of all the domains at the end of a server busy period.

13. The method of claim 10, wherein the identifying subroutine comprises computer code to instruct the processor to resolving a tie between two or more domain queues having the same smallest finish tag by selecting the particular next I/O request so as to reduce the disk latency.

14. The method of claim 10, wherein the memory further comprises a subroutines for instructing the computer to permit deletion of a domain Dk only when the finish tag Fk for domain Dk is less than or equal to the start tags for all other busy domains.

* * * * *